Aug. 9, 1927.
O. H. BARNES
1,638,723
WHEEL GAUGE
Filed March 23, 1926
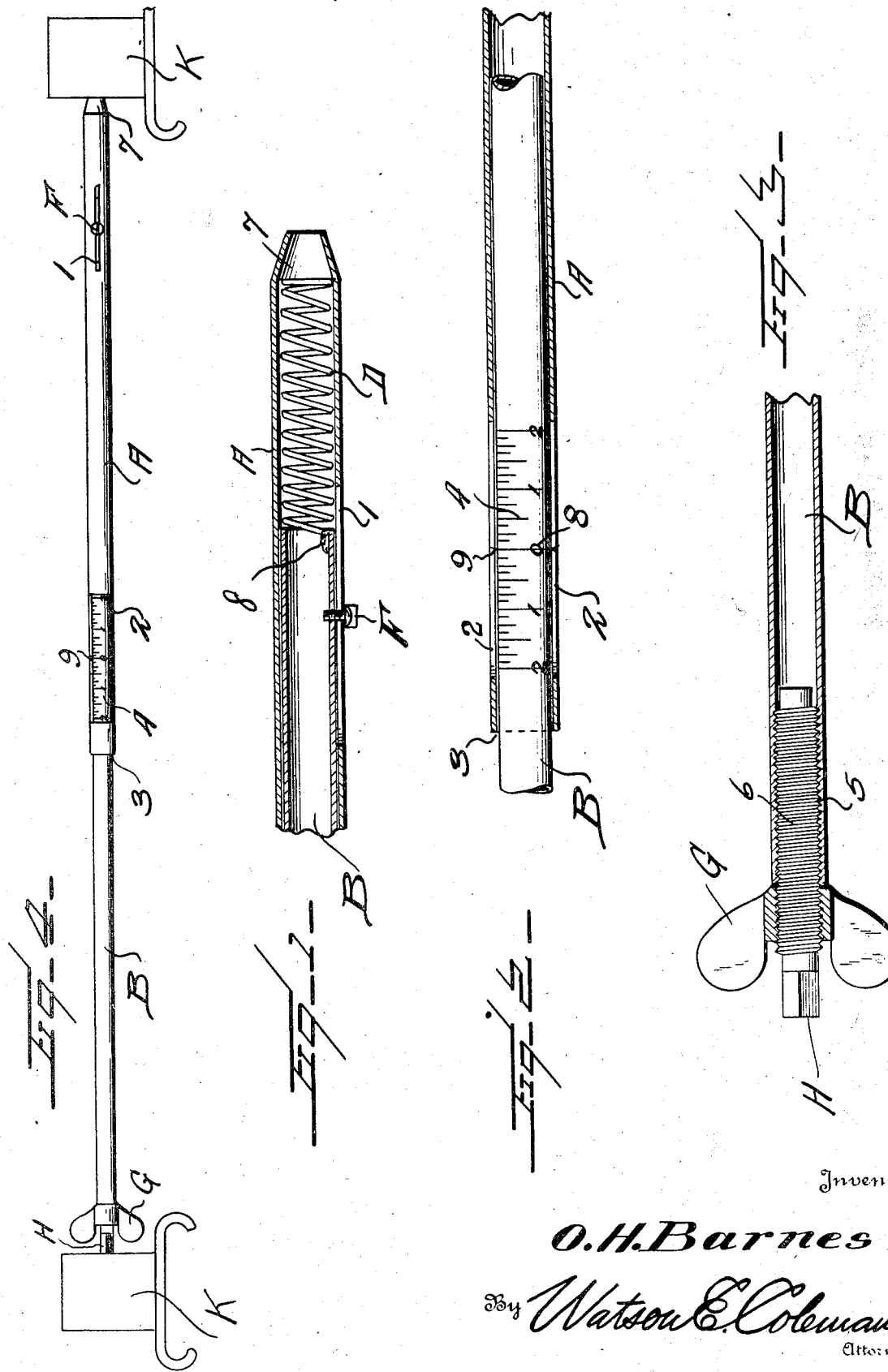
Inventor
O. H. Barnes
By Watson E. Coleman
Attorney Patented Aug. 9, 1927.

1,638,723

UNITED STATES PATENT OFFICE.

OTTO H. BARNES, OF TULSA, OKLAHOMA.

WHEEL GAUGE.

Application filed March 23, 1926. Serial No. 96,781.

This invention relates to means employed for gauging the wheels of motor cars, so that they shall "track" properly on a road.

The primary object of the invention is to provide a device of this character which can be successfully used by one not skilled in the art, thus allowing the owner of a motor car to test and make such adjustments in alining the wheels as shall be found necessary, without sending the motor car to a garage.

A further object of my invention is to provide a device of this character that is simple and inexpensive to manufacture, durable and efficient for the purpose intended, and readily operated.

For correct running of wheels of a motor car, it is essential, particularly in case of the front wheels, that a horizontal line across the face of one wheel shall be parallel, or approximately parallel, to a horizontal line across the face of an opposing wheel on the other side of the car.

The invention consists of an adjustable gauge whereby the wheels can be tested to ascertain whether they are set accurately in relation to each other.

With the above and other objects in view, the invention resides in the novel features of construction, combination, and arrangement of parts to be hereinafter more particularly described, claimed, and illustrated in the accompanying drawing, in which:—

Figure 1 is a longitudinal section through a broken-away portion of my invention showing the sliding scale and operating means therefor;

Fig. 2 is a similar view showing the graduations on the sliding scale and means for reading same;

Fig. 3 is a similar view showing the adjusting means, and

Fig. 4 is a top plan view of an adjustable wheel alining device constructed in accordance with my invention.

Referring to the drawings in detail, like references will be used to designate like parts in the different views.

The wheel alining tool as shown in the attached drawing, comprises an outside tube as indicated by the letter A, and provided with a pair of elongated slots therein, as indicated by the numerals 1 and 2, the purpose of which will be better understood as the description proceeds. The tube A is also formed with an open end 3 to slidably receive therein a tubular member B, which has graduations formed on one side thereof intermediate its ends, as indicated by the numeral 4. One end of the member B is interiorly threaded as at 5, and adapted to receive therein a screw-threaded adjustable member 6 having a square end or shank H thereon, by which means a wrench or other like tool may be employed for operating same. A wing nut G is threaded on the adjustable member and adapted to abut the open end of the tubular member B for locking the adjustable member against rotation. A coil spring D is positioned within the tubular member A, one end of said spring having a seat formed in the tapering end portion of the tube A as indicated by the numeral 7, while the opposite end of the coil spring is secured to the tubular member B as at 8. A thumb screw F is mounted in the member B and adapted to move back and forth in the slot 1 of the member A. The thumb screw F not only prevents disengagement of the members A and B under the tension of the coil spring D, but also prevents rotation of the members relative to each other, so that the scale 4 on the tubular member B is always visible through the elongated opening 2 of the member A.

In Fig. 4 of the drawing the letter K indicates the broken sections of fellies of the wheels of a motor car and the operative working position of my tool or gauge.

In order to find whether the wheels of a motor car or the like are "tracking" properly, it is first necessary to find what the correct distance between the wheels should be, which can usually be determined by consulting a chart prepared for that purpose. After finding the correct distance, the adjustable screw 6 is screwed inwardly or outwardly as the case may be, until the distance from end to end of the tool is equal to the given distance between the wheels, after which the tool is inserted between the wheels, the ends of the device bearing against the opposed sides of the respective fellies as indicated in Fig. 4. As shown in detail in Figure 2 of the drawing, the graduations 4 are arranged in the form of two scales, one scale or set of figures being disposed at one side of a zero character 8 and the other set of graduations or figures being arranged at the opposite side of said zero character.

The characters of the two scales are arranged in sequential order and the zero character acts in common for both scales. The tube A is provided at the side of its slot or side opening 2 with an indicator finger 9 and the said finger is adapted to move along the said scales when the gauge is already in use and is adapted to indicate the relative positions of the wheels. If the wheels are tracking properly, the scale will register zero, and if they are too far apart the same will show to the right of zero marks on the scale and if the distance is less than normal it will show to the left of the zero mark on the scale, said parts moving under tension of the coil spring D.

While I have shown and described the preferred form of my invention, I realize that various minor changes may be resorted to, without departing from the spirit and scope of the invention as claimed, therefore, I do not wish to limit myself to the exact details of construction shown nor to the combination and arrangements of parts.

I claim:

A gauging tool comprising a tubular member provided with an elongated sight opening and having an indicator disposed at one of the longitudinal edges and midway between the ends thereof, a second elongated member slidably received in the tubular member for longitudinal movement and provided with a pair of sets of graduations disposed longitudinally thereof and with a zero character common to both sets, said graduations and the zero character being visible through said opening and adapted to move with relation to said indicator to show the direction and extent of the relative movements of the members.

In testimony whereof I hereunto affix my signature.

OTTO H. BARNES.